(12) United States Patent
Kim et al.

(10) Patent No.: US 9,204,023 B2
(45) Date of Patent: Dec. 1, 2015

(54) CAMERA MODULE HAVING ELECTRONIC CIRCUIT PATTERNS

(71) Applicant: LG INNOTEK CO., LTD., Seoul (KR)

(72) Inventors: Hack Ho Kim, Seoul (KR); HyunKyu Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 40 days.

(21) Appl. No.: 13/929,071

(22) Filed: Jun. 27, 2013

(65) Prior Publication Data

US 2014/0002727 A1 Jan. 2, 2014

(30) Foreign Application Priority Data

Jun. 29, 2012 (KR) .................. 10-2012-0071002

(51) Int. Cl.
*H04N 5/225* (2006.01)
*H04N 13/00* (2006.01)
*H04N 5/74* (2006.01)

(52) U.S. Cl.
CPC ........... *H04N 5/2253* (2013.01); *H04N 5/2252* (2013.01); *H04N 5/2257* (2013.01); *H04N 5/2256* (2013.01); *H04N 5/7441* (2013.01); *H04N 13/0003* (2013.01)

(58) Field of Classification Search
CPC .............. H04N 5/2252; H04N 2201/02483; H04N 5/2256; H04N 5/2253; H04N 5/2257; H04N 13/0003; H04N 13/0037; H04N 13/0048; H04N 5/23296; H04N 5/00; H04N 5/7441
USPC ................ 348/372–374, 208.12, 345, 211.9, 348/240.99, 276, E13.055
See application file for complete search history.

(56) References Cited

U.S. PATENT DOCUMENTS

| | | | | |
|---|---|---|---|---|
| 7,469,100 | B2* | 12/2008 | Toor et al. ..................... | 396/144 |
| 8,115,856 | B2* | 2/2012 | Cheng ........................... | 348/357 |
| 8,698,951 | B2* | 4/2014 | Kang et al. .................... | 348/374 |
| 2005/0232095 | A1* | 10/2005 | Okamoto et al. ........... | 369/44.11 |
| 2008/0165427 | A1* | 7/2008 | Tseng et al. ................. | 359/666 |
| 2009/0079863 | A1* | 3/2009 | Aoki et al. .................... | 348/374 |
| 2009/0213232 | A1* | 8/2009 | Asakura et al. ............ | 348/208.4 |
| 2009/0322929 | A1* | 12/2009 | Webster ........................ | 348/340 |
| 2010/0099278 | A1* | 4/2010 | Jung ............................... | 439/74 |
| 2010/0247086 | A1* | 9/2010 | Tallaron et al. ............... | 396/133 |
| 2010/0295987 | A1* | 11/2010 | Berge ............................ | 348/360 |
| 2010/0321560 | A1* | 12/2010 | Hosoe ........................... | 348/372 |
| 2011/0134303 | A1* | 6/2011 | Jung et al. ..................... | 348/340 |
| 2011/0221950 | A1* | 9/2011 | Oostra et al. ................. | 348/335 |
| 2012/0026451 | A1* | 2/2012 | Nystrom ....................... | 349/200 |
| 2012/0200764 | A1* | 8/2012 | Afshari et al. ................ | 348/345 |
| 2012/0270422 | A1* | 10/2012 | Chiu et al. ...................... | 439/83 |
| 2012/0315952 | A1* | 12/2012 | Du et al. ..................... | 455/556.1 |
| 2012/0315953 | A1* | 12/2012 | Du et al. ..................... | 455/556.1 |
| 2013/0050571 | A1* | 2/2013 | Tam ............................... | 348/374 |

* cited by examiner

*Primary Examiner* — Hung Lam
(74) *Attorney, Agent, or Firm* — Birch, Stewart, Kolasch & Birch, LLP

(57) ABSTRACT

A motor is provided, the motor including a PCB supplying a control signal and an electric power, a housing arranged at an upper surface of the PCB and mounted therein with at least one lens, an actuator arranged on the housing, first and second electronic circuit patterns formed on a surface opposite to the PCB and on an external wall, where the PCB and the first electronic circuit pattern are directly coupled.

11 Claims, 4 Drawing Sheets

CAMERA MODULE HAVING ELECTRONIC CIRCUIT PATTERNS

CROSS-REFERENCE TO RELATED APPLICATION

The present application is based on, and claims priority from, Korean Application Number 10-2012-0071002, filed on Jun. 29, 2012, the disclosure of which is incorporated by reference herein in its entirety.

BACKGROUND OF THE INVENTION

1. Field of the Invention

The present disclosure relates to a camera module.

2. Description of Related Art

A PCB (Printed Circuit Board) is a component connecting electronic circuits among electronic parts to supply an electric power and a control signal.

Recently, a camera module has been developed capable of performing an auto focusing operation by using an actuator, and an auto focus terminal and a PCB auto focus pad are conductively connected to drive an actuator.

The actuator requires an electric power and a control signal by being connected to a PCB mounted with an image sensor. To this end, a separate connection board functioning as a wiring is generally interposed between the actuator and the PCB.

However, the installation of a separate connection board is disadvantageous in that it is cumbersome to manufacture a connection board and to control inventory, and a camera module increases in size as much as the size of the connection board.

SUMMARY OF THE INVENTION

Exemplary aspects of the present disclosure are to substantially solve at least the above problems and/or disadvantages and to provide at least the advantages as mentioned below. Thus, the present disclosure is directed to provide a camera module configured to reduce a process, an assembly time and an assembly cost required for bonding a housing to a substrate.

In one general aspect of the present disclosure, there is provided a camera module, the camera module comprising:

an image sensor disposed on a PCB;

a housing arranged at an upper surface of the PCB and mounted therein with at least one lens;

an actuator arranged on the housing;

a first electronic circuit pattern formed on an external wall of the housing; and a second electronic circuit pattern electrically connected to the first electronic circuit pattern and coupled to the PCB.

Preferably, but not necessarily, the second electronic circuit pattern may be protruded from a bottom surface of the housing.

Preferably, but not necessarily, the PCB may be formed with a terminal unit conductively connected to the second electric circuit pattern layer.

Preferably, but not necessarily, the terminal unit may be protruded from the PCB.

Preferably, but not necessarily, the housing may be formed with a resin material.

Preferably, but not necessarily, the terminal unit is conductively connected to a terminal on the actuator by the first and second electric circuit pattern layers.

Preferably, but not necessarily, the actuator may perform any one of auto focusing function, hand shake prevention function, shutter function, and zoom function.

Preferably, but not necessarily, the actuator may adjust an image captured on the image sensor by adjusting a refractive index of light passing the lenses.

Preferably, but not necessarily, the actuator may be formed by any one of a MEMS (Micro Electro Mechanical System) actuator, a non-MEMS actuator such as a liquid crystal lens and a piezopolymer lens, a silicone type actuator, a liquid lens, a VCM (Voice Coil Motor), an SMA (Shape Memory Alloy) actuator and piezoelectric actuator.

Preferably, but not necessarily, an adhesive may be disposed between the housing and the PCB.

Preferably, but not necessarily, the adhesive may be any one of thermosetting epoxy, UV (Ultraviolet)-curable epoxy and conductive epoxy.

Preferably, but not necessarily, the first electronic circuit pattern and the second electronic circuit pattern are respectively formed in a layer.

In another general aspect of the present disclosure, there is provided a camera module, the camera module comprising:

an image sensor disposed on a PCB;

a housing arranged at an upper surface of the PCB and mounted therein with at least one lens;

an actuator arranged on the housing;

a first electronic circuit pattern formed on an external wall of the housing;

a coupling hole formed at a bottom surface of the housing and electrically connected to the first electronic circuit pattern; and a pin formed by being protruded from the PCB and electrically connected by being insertedly coupled to the coupling hole.

DETAILED DESCRIPTION OF THE INVENTION

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, a camera module according to the exemplary embodiments of the present disclosure will be described in detail with reference to the accompanying drawings.

Figure 1:
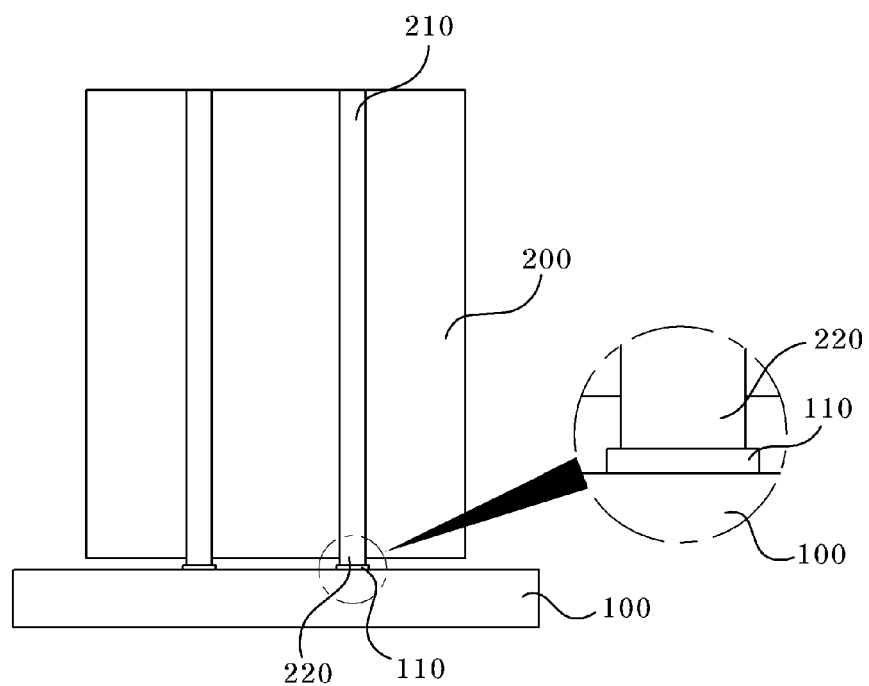
FIG. 1 is a mimetic lateral view illustrating a camera module according to a first exemplary embodiment of the present disclosure.
Figure 2:
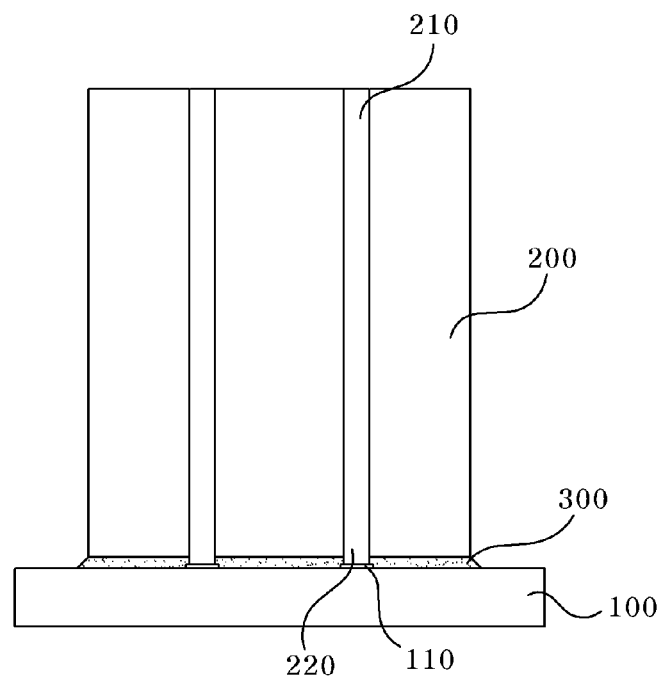
FIG. 2 is a mimetic lateral view illustrating an additional configuration of a camera module according to a first exemplary embodiment of the present disclosure.
Figure 3:
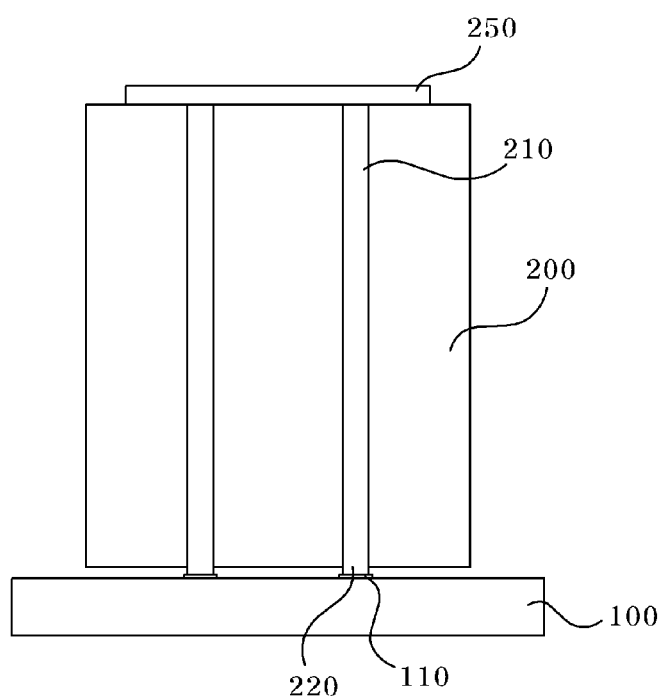
FIG. 3 is a mimetic lateral view illustrating an additional configuration of a camera module according to a first exemplary embodiment of the present disclosure.

FIG. 1 is a mimetic lateral view illustrating a camera module according to a first exemplary embodiment of the present disclosure, FIG. 2 is a mimetic lateral view illustrating an additional configuration of a camera module according to a first exemplary embodiment of the present disclosure, and FIG. 3 is a mimetic lateral view illustrating an additional configuration of a camera module according to a first exemplary embodiment of the present disclosure.

The camera module according to a first exemplary embodiment of the present disclosure may include a PCB (100) mounted with an image sensor and a housing (200).

The housing (200) is arranged at an upper surface of the PCB (100), and may include therein at least one lens. The housing (200) may be centrally formed with a space in which a lens housing supporting the lens is mounted, and the space may be provided in a shape corresponding to that of the lens housing. The space may be provided with a cylindrical shape. The housing (200) may include at least one impurity, nay be injection molded with a material that changes in physical properties when applied with at least one external factor including light and heat, and may be configured, if necessary, in one body with a base mounted with an IRCF (Infrared Cut-off Filter).

The housing (200) may be provided with a cubic shape having a cylindrical shape. However, the present disclosure is not limited thereto, and the housing (200) may change in shape according to shape and size of a lens housing. For example, in a case lenses are mounted, each lens having a different diameter based on difference of magnification of lens mounted on the lens housing, the housing (200) may be formed in a multi-shaped lens housing, each having a different diameter based on each lens diameter. In the exemplary embodiment of the present disclosure, a first electronic circuit pattern (210) may be formed at an upper surface of the housing (200) that may be useable as a barrel of a camera module or a camera housing, and a second electronic circuit pattern (220) may be at a bottom surface of the housing (200). The first and second electronic circuit patterns (210, 220) may be realized by SURFACE CIRCUIT PATTERN FORMING (Molded Interconnect Device) technology. The first electronic circuit pattern (210) and/or the second electronic circuit pattern (220) may be respectively formed in a layer.

The second electronic circuit patterns (220) may be protruded from the bottom surface of the housing (200). For example, the housing (200) is processed at the bottom surface with embossing and the protruded area may be formed with the second electronic circuit pattern (220) using the SURFACE CIRCUIT PATTERN FORMING technology. Meanwhile, a terminal unit (110) of the PCB (100) may be protruded from an upper surface of the PCB (100), or may be formed on the upper surface of the PCB (100) by not being protruded.

Furthermore, an external surface of the housing (200) is formed with the first electronic circuit pattern (210) which may be electrically connected to the second electronic circuit pattern (220) of the housing (200).

At this time, the first electronic circuit pattern (210) and the second electronic circuit pattern (220) of the housing (200) may be simultaneously formed using the SURFACE CIRCUIT PATTERN FORMING technology.

The SURFACE CIRCUIT PATTERN FORMING technology may be largely divided to three technologies.

First method is a patterning method through dual forming, where a portion forming the housing (200) and a portion forming the first and second electronic circuit patterns (210, 220) are injection molded using synthetic resins of mutually different materials. At this time, the portion of the housing (200) is injected with insulation material, and the portion forming the first and second electronic circuit patterns (210, 220) is injected with conductive synthetic resin, or the portion forming the first and second electronic circuit patterns (210, 220) is injected with a synthetic resin that is easy for metal plating, and the first and second electronic circuit patterns (210, 220) are completed by post-treatment such as plating work after the housing (200) is injection molded.

Second method is such that the housing (200) is injection-molded while being contained with impurities reacting to heat and light, and the injection-molded housing (200) is formed with a wiring pattern that is to be formed with the first and second electronic circuit patterns (210, 220) through a surface patterning work such as laser exposure. That is, the housing (200) according to the present disclosure is injection molded with materials including at least one the impurity and changeable in physical properties if applied with at least one of heat and light. The housing (200) injection molded with materials containing impurities changes in physical properties at a portion receiving the light, if exposed to light by means such as laser beam (L) capable of transmitting light and/or heat. That is, if laser is incident to expose or apply heat to a surface of a body, a physical property of a surface of the housing (200) exposed by the laser is changed by influence of impurities. That is, the impurities contained in the housing (200) evaporate or vaporize due to the light and heat from the laser (L), and change along with ambient materials. The impurities may change the physical properties of the exposed portion of the housing (200) to a conductible state, or to a state where plating or coating is easy, albeit not being conductible. Composition of impurities or the light exposure process is well known art and no further detailed explanation will be omitted herefrom. Using the fact that the surface of the housing (200) can be changed in physical properties according to laser exposure, the portion exposed to the laser beam (L) may be formed with the first and second electronic circuit patterns (210, 220). That is, if the laser beam (L) is irradiated on the surface of the housing (200) formed with the shapes of electronic circuit patterns, the surface of the housing (200) exposed to the laser beam (L) may be formed, albeit not visible, with the first and second electronic circuit patterns (210, 220).

Once the first and second electronic circuit patterns (210, 220) are formed, the surface of the housing (200) can be mounted with an SMD parts or accessory electronic parts without any problem because the first and second electronic circuit patterns (210, 220) per se have conductible physical properties. Furthermore, the surface of the first and second electronic circuit patterns (210, 220) may be additionally stacked with conductive metal layers (not shown) as illustrated in the drawings. That is, the first and second electronic circuit patterns (210, 220) may be formed by plating metal materials, or may be formed by coating conductive materials.

Meanwhile, third method is available as one of the SURFACE CIRCUIT PATTERN FORMING technologies. The third method is such that a non-circuit portion is etched after front metallization for patterning, where an entire surface of the housing (200) is metalized, portions of the first and second electronic circuit patterns (210, 220) are left untouched, and the remaining portion is etched to form the first and second electronic circuit patterns (210, 220) on the housing (200).

In addition, as illustrated in FIG. 3, an actuator (250) is included in the camera module capable of performing an auto focusing of an optical image incident on the image sensor or performing a handshake prevention function.

That is, the actuator (250) is arranged on the housing (200) to additionally perform the auto focusing function of the camera module. As illustrated in FIG. 3, the actuator (250) may be arranged at an upper surface or a bottom surface of the housing (200). However, the present disclosure is not limited thereto and an installation position of the actuator (250) may be changed within a design-allowable scope.

A terminal unit (not shown) of the actuator (250) may be conductively connected to the first and second electronic circuit patterns (210, 220) on the housing (200), and the first and second electronic circuit patterns (210, 220) may be conductively connected to a terminal unit of the PCB (100), and in a case a conductive layer (120, see FIG. 3) of metal material is formed on the upper surface of the first and second electronic circuit patterns (210, 220), the actuator (250) may receive an electric power or a control signal through the conductive layer (120).

The actuator (250) may be variably used according to needs of device, and may be formed using any one of a piezo/polymer lens, an optical diaphragm, a liquid micro lens, an MEMS actuator, an MEMS piezo actuator, an MEMS bimorph actuator, an MEMS thermal actuator, an MEMS magnetic actuator, an MEMS liquid actuator, a non-MEMS type actuator, a silicon type actuator, a liquid lens, a VCM actuator, an SMA actuator and a piezoelectric actuator, or a combination thereof.

Furthermore, the actuator (250) can perform an auto focusing function, a handshake prevention function, a shutter function and a zoom function of an image captured on the image sensor by using at least one lens.

Meanwhile, the actuator (250) may be provided with at least two connection terminals to allow a plus terminal to be connected to a ground terminal, where the connection terminal may be connected to the first and second electronic circuit patterns (210, 220) using a soldering, a wire bonding or an Ag epoxy. At least two connection terminals may be formed where one of the connection terminals is connected to the plus terminal and the other is connected to the ground terminal.

Thus, the camera module according to the exemplary embodiment of the present disclosure is configured such that the first and second electronic circuit patterns (210, 220) realized by the SURFACE CIRCUIT PATTERN FORMING technology on the bottom surface and the external surface of the housing (200) are brought into contact with the terminal unit (110) of the PCB (100) for electrical connection.

In addition, as illustrated in FIG. 2, the camera module according to the first exemplary embodiment of the present disclosure is configured such that, in order to maintain the second electronic circuit pattern (220) of the housing (200) to be in brought into contact with the terminal unit (110) of the PCB (100), an adhesive (300) may be disposed between the housing (200) and the PCB (100) while the second electronic circuit pattern (220) of the housing (200) and the terminal unit (110) of the PCB (100) are being contacted. At this time, the adhesive (300) may be applied with any one of thermosetting epoxy, UV (Ultraviolet)-curable epoxy and conductive epoxy.

Figure 4:
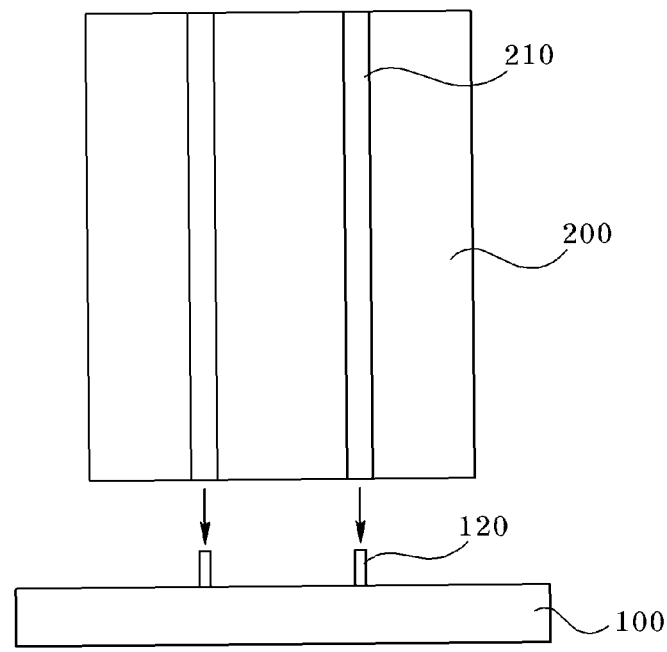
FIG. 4 is a mimetic lateral view illustrating an additional configuration of a camera module according to a second exemplary embodiment of the present disclosure.
Figure 5:
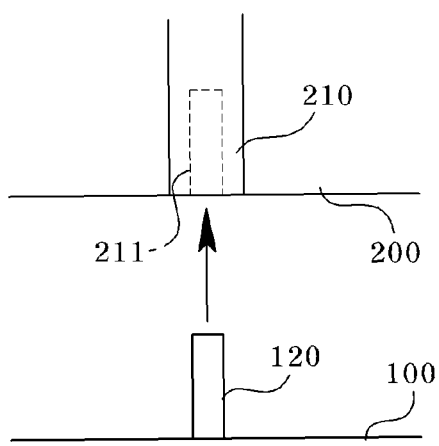
FIG. 5 is a partial cross-sectional view illustrating a state in which an electrode line area of a camera module is formed with a pin-inserted coupling hole according to a second exemplary embodiment of the present disclosure.

FIG. 4 is a mimetic lateral view illustrating an additional configuration of a camera module according to a second exemplary embodiment of the present disclosure, and FIG. 5 is a partial cross-sectional view illustrating a state in which an electrode line area of a camera module is formed with a pin-inserted coupling hole according to a second exemplary embodiment of the present disclosure.

The camera module according to the second exemplary embodiment of the present disclosure may be mounted therein with a camera constituent elements including one or more lenses incident on by an optical image, may be mounted thereoutside with a first electronic circuit pattern (210) realized by the SURFACE CIRCUIT PATTERN FORMING technology, and may include a housing (200) formed with a coupling hole (211) electrically connected to the first electronic circuit pattern (210), and a PCB (100) formed with a pin (120) electrically connected to the first electronic circuit pattern (210) by being coupled to the coupling hole (211) of the housing (200).

That is, in a case the coupling hole (211) of the housing (200) is inserted by the pin (120) of the PCB (100), the housing (200) is automatically aligned on the PCB (100), and the camera constituent elements of the housing (200) and the PCB (100) are simultaneously and electrically connected through the first electronic circuit pattern (210) and the pin (120).

Thus, the camera module according to the second exemplary embodiment of the present disclosure can couple the housing and the substrate by inserting the pin of the substrate into the coupling hole of the housing.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is (US):

1. A camera module, the camera module comprising:
an image sensor disposed on a PCB;
a housing arranged at an upper surface of the PCB and disposed therein with at least one lens;
an actuator arranged on an upper surface of the housing;
a first electronic circuit pattern formed along an external side wall of the housing from an upper end of the external side wall to a lower end of the external side wall, and connected to the actuator; and housing; and
a second electronic circuit pattern connected to the first electronic circuit pattern and coupled to the PCB, wherein the second electronic circuit pattern is downwardly protruded from a bottom surface of the housing to form a disparate space between the lower end of the external sidewall of the housing and the upper surface of the PCB, and
wherein an adhesive is disposed in the disparate space;
wherein the first electronic circuit pattern comprises a pair of electronic circuit patterns to supply a current to the actuator, and
wherein the pair of electronic circuit patterns is disposed on one side surface of the external side wall of the housing.

2. The camera module of claim 1, wherein the PCB is formed with a terminal unit conductively connected to the second electric circuit pattern layer.

3. The camera module of claim 2, wherein the terminal unit is upwardly protruded from the PCB.

4. The camera module of claim 2, wherein the terminal unit is conductively connected to a terminal on the actuator by the first and second electric circuit patterns.

5. The camera module of claim 1, wherein the housing is formed with a resin material.

6. The camera module of claim 1, wherein the actuator performs any one of auto focusing function, hand shake prevention function, shutter function, and zoom function.

7. The camera module of claim 1, wherein the actuator adjusts an image captured on the image sensor by adjusting a refractive index of light passing the lenses.

8. The camera module of claim 1, wherein the actuator is formed by any one of a MEMS (Micro Electro Mechanical System) actuator, a non-MEMS actuator comprising a liquid crystal lens and a piezo/polymer lens, a silicone type actuator, a liquid lens, a VCM (Voice Coil Motor), an SMA (Shape Memory Alloy) actuator and piezoelectric actuator.

9. The camera module of claim 1, wherein the adhesive is any one of thermosetting epoxy, UV (Ultraviolet)-curable epoxy and conductive epoxy.

10. The camera module of claim 1, wherein the first electronic circuit pattern and the second electronic circuit pattern are respectively formed in a layer.

11. The camera module of claim 1, wherein one side surface of the first electronic circuit pattern is entirely exposed to outside.

* * * * *